United States Patent [19]

Nishimura et al.

[11] Patent Number: 5,106,355
[45] Date of Patent: Apr. 21, 1992

[54] PLANETARY GEAR UNIT

[75] Inventors: Shinji Nishimura; Shuzou Isozumi, both of Hyogo, Japan

[73] Assignee: Mitsubishi Denki K.K., Tokyo, Japan

[21] Appl. No.: 652,734

[22] Filed: Feb. 8, 1991

[30] Foreign Application Priority Data

Feb. 14, 1990 [JP] Japan .................................. 2-34450

[51] Int. Cl.⁵ .............................................. F16H 55/12
[52] U.S. Cl. ..................................... 475/344; 74/435; 74/439
[58] Field of Search .................. 475/344; 74/435, 450, 74/437, 434, 448, 439

[56] References Cited

U.S. PATENT DOCUMENTS

| | | | |
|---|---|---|---|
| 1,217,427 | 2/1917 | Fast | 475/344 |
| 1,609,076 | 11/1926 | Evans | 475/344 X |
| 3,888,357 | 6/1975 | Bauer et al. | 74/448 X |
| 4,449,425 | 5/1984 | Carden | 74/448 X |
| 4,498,351 | 2/1985 | Ahoor | 74/439 |
| 4,881,416 | 11/1989 | Isozumi | 74/7 A |
| 4,932,613 | 6/1990 | Tiedman et al. | 475/344 X |
| 4,942,781 | 7/1990 | Hori | 475/344 X |
| 4,986,802 | 1/1991 | Scoville et al. | 475/344 X |

FOREIGN PATENT DOCUMENTS 1089328  4/1984  U.S.S.R. ................ 475/344

Primary Examiner—Leslie A. Braun
Assistant Examiner—David E. Henn
Attorney, Agent, or Firm—Sughrue, Mion, Zinn, Macpeak & Seas

[57] ABSTRACT

In an planetary gear unit comprising a sum gear, an internal gear, and planetary gears which are supported through a carrier and engaged with the sun gear and the internal gear, at least a cut is formed in the internal gear in such a manner that the position of the cut is not coincident with the angular intervals of the planetary gears in the direction of revolution, and the teeth are partially removed by the cut. Hence, the part of the internal gear where the cut is formed may be curved inwardly or flattened to provide a space for accommodating anything which otherwise obstructs the installation of the planetary gear unit.

4 Claims, 4 Drawing Sheets

PLANETARY GEAR UNIT

BACKGROUND OF THE INVENTION

This invention relates to planetary gear units, and more particularly to a planetary gear unit which may be employed, for instance, as the speed reducer of a starter.

A conventional planetary gear unit employed, for instance, in the speed reducer of a starter, as shown in FIG. 5, comprises: a sun gear 1 mounted on the shaft of a prime motor such as an electric motor (not shown); an internal gear 2 arranged coaxially with the sun gear 1; and three planet gears 3 engaged with both the sun gear 1 and the internal gear 2.

The internal gear 2 has teeth 2a formed in its inner cylindrical wall at equal intervals.

The three planet gears 3 are supported by a carrier (not shown) at equal angular intervals in the direction of revolution.

The carrier is coupled to the output shaft (not shown).

When employed as a speed reducer for a starter, the planetary gear unit thus constructed is engaged with the starter as follows: The internal gear 2 is engaged with the frame 5 of the starter in such a manner that protrusions 2b formed on the outer cylindrical wall of the internal gear 2 are engaged with recesses 6 formed in the inner cylindrical wall of the frame 5, so that the rotation of the internal gear 2 around its axis is prevented.

In FIG. 5, reference numeral 7 designates throughbolts of the starter (such as a coaxial starter).

The starter employing the above-described conventional planetary gear unit suffers from the following difficulties: When something exists outside the frame 5 obstructing it partially, it is necessary to miniaturize the planetary gear unit to reduce the outside diameter of the frame 5.

However, the miniaturization of the planetary gear unit give rise to another problem.

That is, the planetary gear unit cannot be miniaturized without reduction of the gear ratio or gear module.

However, the reduction of the gear ratio or gear module makes it difficult to obtain the predetermined torque and speed, or to maintain the predetermined characteristics and gear strength.

This problem occurs not only with the starter but also with other devices incorporating the planetary gear unit.

SUMMARY OF THE INVENTION

Accordingly, an object of this invention is to eliminate the above-described difficulties accompanying a conventional planetary gear unit.

More specifically, an object of the invention is to provide an planetary gear unit which, in the case where, when it is installed, something comes outside the internal gear obstructing the installation, can be installed without miniaturization of it, avoiding the obstruction.

The foregoing object and other objects of the invention have been achieved by the provision of a planetary gear unit comprising a sun gear, an internal gear, and a plurality of planetary gears which are supported through a carrier and engaged with the sun gear and the internal gear, in which, according to the invention, the internal gear has a cut at least in a part thereof which is other than those which are coincident with the angular intervals of the planetary gears in the direction of revolution, in such a manner that the teeth are removed from the part.

In the case where an obstruction exists outside the internal gear obstructing the installation of the planetary gear unit, the cut is formed in the part of the internal gear which is on the phantom line connecting the obstruction and the center of the sun gear in such a manner that the teeth are removed from the part.

The internal gear is not engaged with the planetary gears at the cut.

Therefore, the part of the internal gear which is on the phantom line may be curved inwardly or made flat in the outer peripheral portion, to avoid the obstruction.

The planetary gear passing over the cut does not contribute to the transmission of torque; however, at least one of the other planetary gears coupled through the carrier is engaged with the internal gear, thus transmitting the torque to the output shaft.

The nature, principle and utility of the invention will become more apparent from the following detailed description when read in conjunction with the accompanying drawings.

DETAILED DESCRIPTION OF THE INVENTION

Preferred embodiments of this invention will be described with reference to the accompanying drawings.

Figure 1:
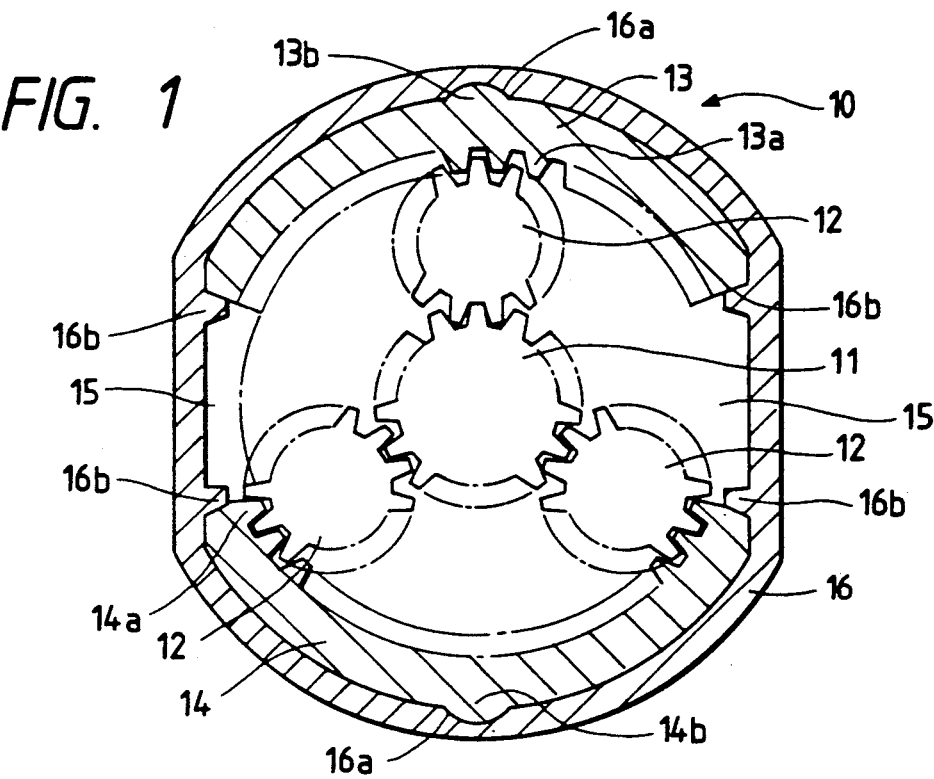
FIG. 1 is a sectional view showing a first example of a planetary gear unit according to this invention.

A first embodiment of the invention, a planetary gear unit is indicated generally at 10 in FIG. 1.

The planetary gear unit 10 comprises: a sun gear 11; and three planetary gears 12 provided at equal angular intervals in the direction of revolution and supported through a carrier (not shown).

The planetary gear unit further comprises internal segment gears 13 and 14 which are arcuate.

The internal segment gears 13 and 14 are disposed outside the planetary gears 12 in such a manner that they are engaged with the planetary gears and are opposed to each other (or positioned above and below in FIG. 1).

If it is assumed that the planetary gear unit 10 has a complete internal gear, then as is seen from FIG. 1 the internal segment gears 13 and 14 form parts of the complete internal gear, and the remaining parts are cuts (or spaces) 15 and 15.

The internal segment gears 13 and 14 have protrusions 13b and 14b on their outer walls, respectively.

The protrusions 13b and 14b are engaged with recesses 16a and 16a formed in a frame 16, respectively, so that, the rotation of the internal segment gears 13 and 14 around the axis is prevented.

Furthermore, each of the internal segment gears 13 and 14 is fixedly secured to the frame 16 with both ends engaged with protrusions 16b formed on the inner wall of the frame 16.

Thus, the internal segment gears 13 and 14 are not continuous with each other; that is, the cuts 15 are provided between them.

However, the teeth 13a and 14a of the internal segment gears 13 and 14 have the pitch which is mechanistically determined as if teeth were present in the cuts, thus forming one internal gear.

Accordingly, when the three planetary gears 12 are revolved by the rotation of the sun gear 11 while being rotated, they are each moved from one internal segment gear (13) through the spaces 15 to the other internal segment gear (14) while being engaged correctly.

Hence, the portions of the frame 16 where the spaces 15 are provided can be made flat, so as to receive something which may obstruct the installation of the planetary gear unit.

If the spaces 15 are provided in coincidence with the angular interval of the planetary gears 12 in the direction of revolution (in the case of FIG. 1, three positions occurring at angular intervals of 120° because the three planetary gears 12 are arranged at equal angular intervals), then the planetary gears 12 will pass through the spaces 15, so that the torque cannot be transmitted to the output shaft.

Hence, if the spaces 15 are provided at other than those positions, then the number of spaces 15 is not limited.

That is, as long as at least one of the planetary gears 12 is engaged with the internal segment gear, the torque can be transmitted to the output shaft.

As is apparent from the above description, the planetary gear unit can avoid the obstruction positioned outside the internal gear when installed.

Moreover, the planetary gear unit can be employed as the speed reducer in a starter for instance.

Figure 2:
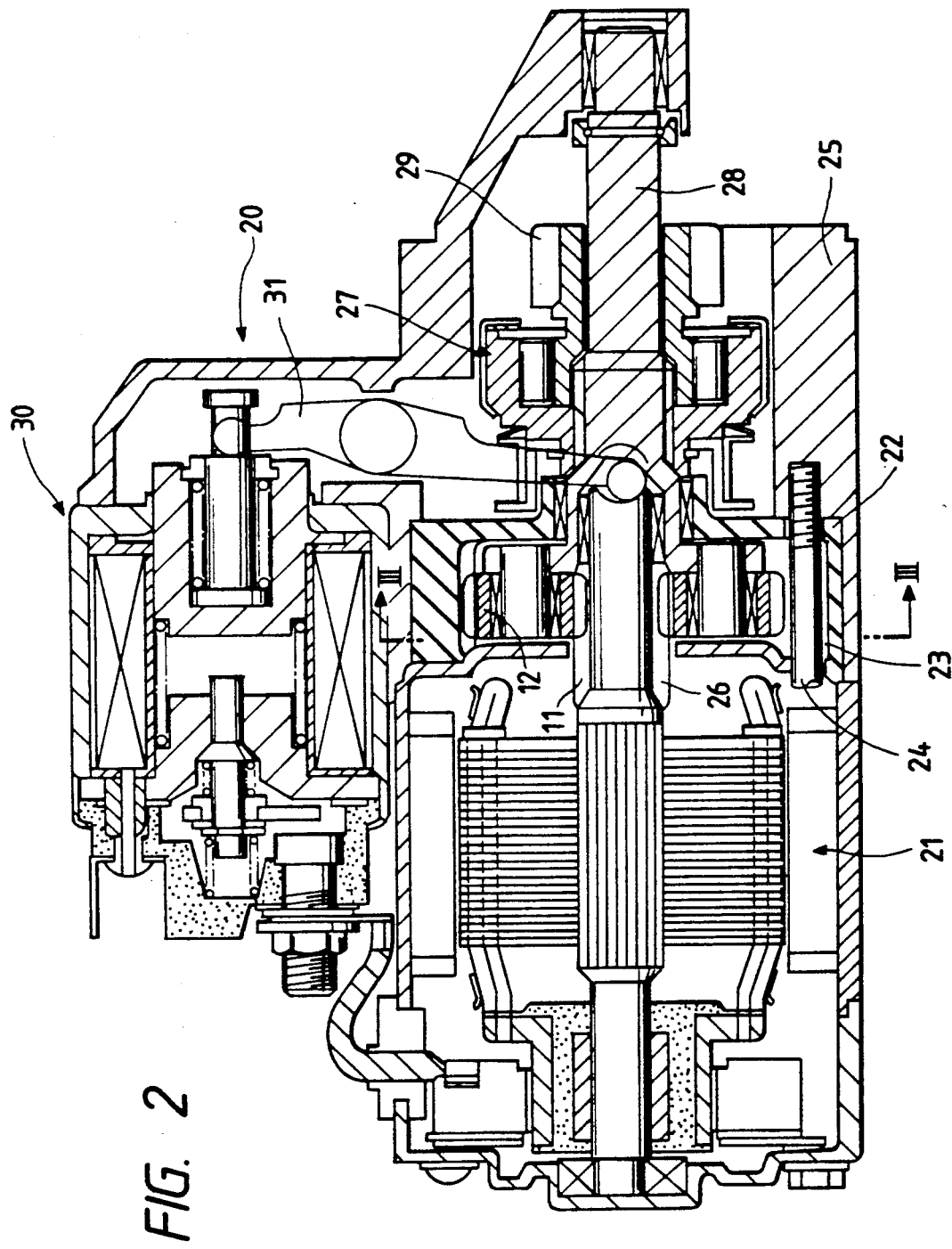
FIG. 2 is a sectional view showing a biaxial starter motor employing as its speed reducer a second example of the planetary gear unit according to the invention.

This will be described with reference to a biaxial starter motor 20 as shown in FIG. 2.

In order to increase the density in arrangement of the components in an engine room, there has been a strong demand for miniaturization of the motor section of a starter motor.

As is seen from the following equation representing the volume of the motor section 21, $$\text{Volume} \propto Te/g \cdot I \times \sqrt{Rs}$$

where Te is the torque, g is the gear ratio, I is the drive current, and Rs is the motor resistance. If g is increased, then the miniaturization may be achieved.

However, the increase of g results in an increase of the outside diameter of the internal gear.

In this case, since the through bolts; are positioned outside the internal gear, the position of the through-bolts gives rise to another problem in the installation of the starter in the engine room.

That is, in this case, miniaturization of the motor section is difficult.

Figure 3:
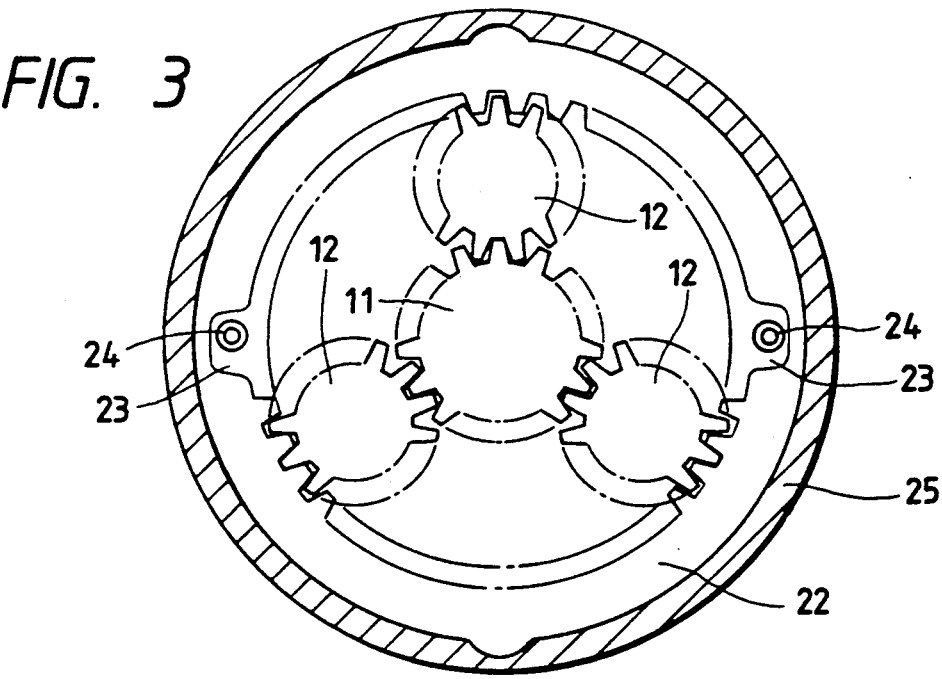
FIG. 3 is a sectional view taken along line III—III in FIG. 2.

However, the miniaturization of the motor section can be achieved by the following method: As shown in FIG. 3, cuts 23 and 23 are formed in the inner cylindrical wall of the internal gear 23 at two positions, and through-bolts 24 and 24 are arranged so as to extend through the cuts 23 and 23.

That is, the through-bolts 24 are arranged inside the internal gear 22, not outside the frame 25 of the starter motor.

Thus, the motor section 21 can be miniaturized without adverse effect on the installation of the starter motor 20 in the engine room.

In FIG. 2, reference numeral 26 designates the armatures rotary shaft of the motor section 21; 27, an overrunning clutch; 28, an output shaft; 29, a pinion engaged with the ring gear of the engine; 30, an electromagnetic switch; and 31, a shift lever.

In the above-described embodiment, the planetary gear, unit is employed in the so-called biaxial starter motor.

Figure 4:
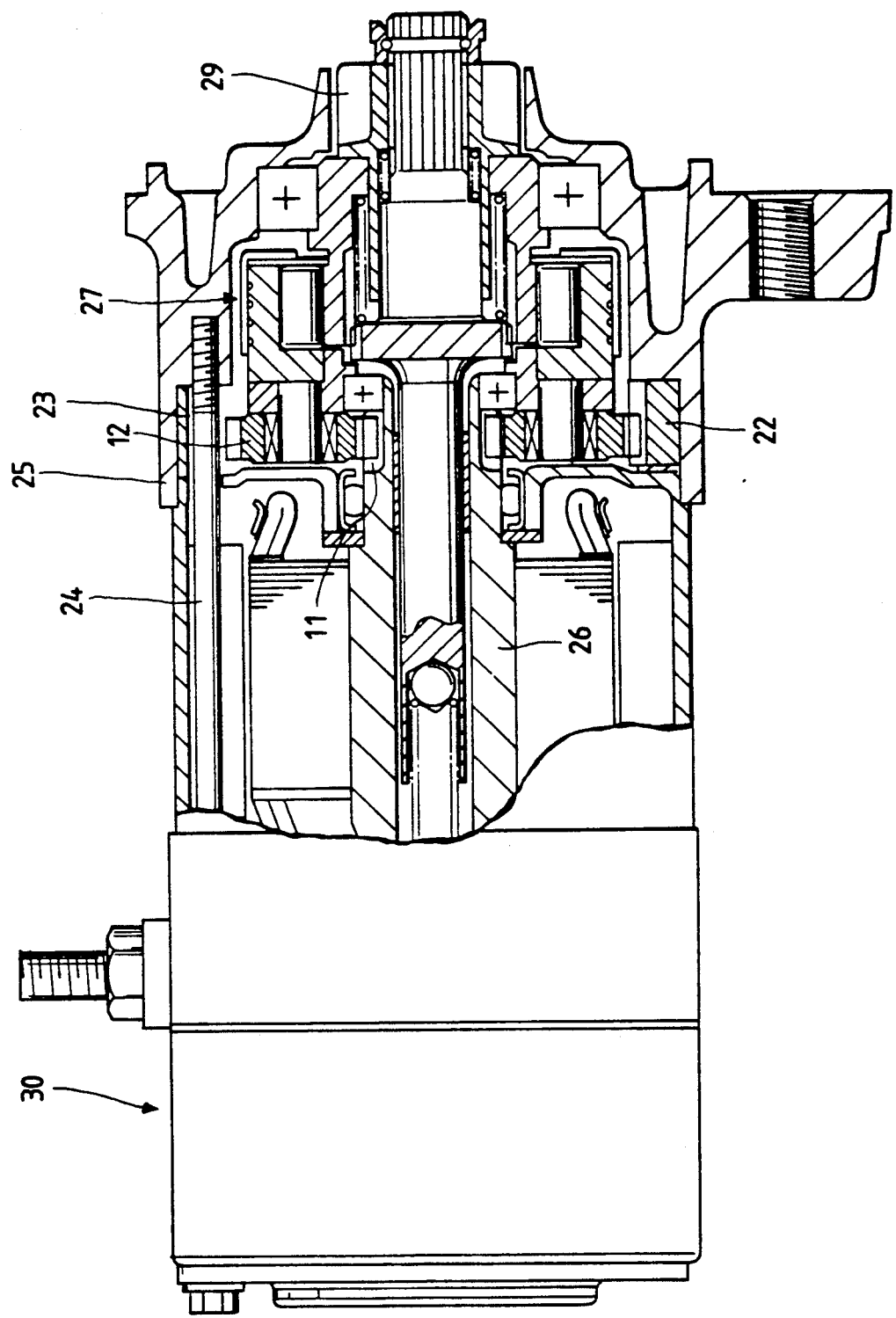
FIG. 4 is a sectional view showing a coaxial starter employing the planetary gear unit of the invention as its speed reducer.
Figure 5:
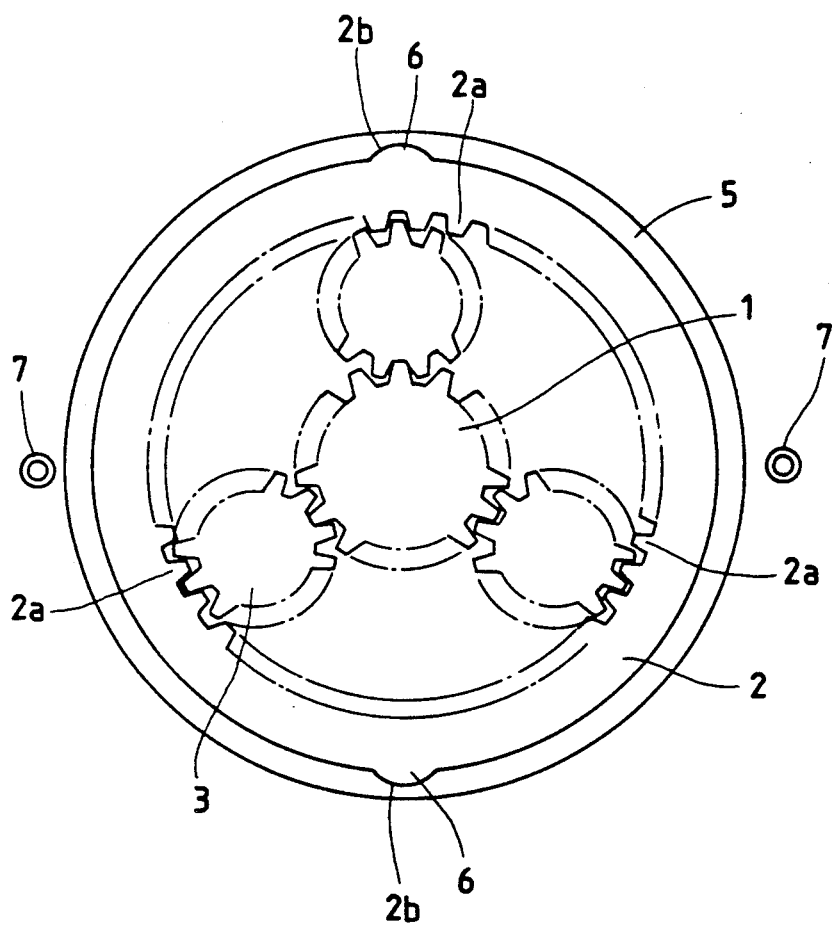
FIG. 5 is a sectional view showing a starter employing a conventional planetary gear unit as its speed reducer.

In addition, the planetary gear unit of the invention may be employed as the speed reducer in a coaxial starter as shown in FIG. 4.

As was described above, in the case where, when a planetary gear unit is installed, something comes outside the internal gear obstructing the installation, the planetary gear unit of the invention can be installed avoiding the obstruction, because in the planetary gear unit the frame is partially flatten by cutting the internal gear.

Thus, the planetary gear unit of the invention is considerably high in the degree of freedom with respect to installation.

While the invention has been described in connection with the preferred embodiments thereof, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A planetary gear unit comprising a sun gear, an internal gear, and a plurality of planetary gears which are supported through a carrier and engaged with said sun gear and said internal gear, in which
said internal gear has at least one space formed therein which teeth are devoid of any teeth such that said internal gear is not continuous, said space being positioned such that at least one of the planetary gears is always engaged with said internal gear.

2. The planetary gear unit according to claim 1, in which said plurality of said planetary gears are three planetary gears provided at angular intervals of 120°.

3. The planetary gear unit according to claim 1, further comprising another space which is disposed 180° apart from said at least one space.

4. The planetary gear unit according to claim 3, wherein said internal gear comprises first and second internal segment gears, said spaces being formed between said first and second internal segment gears.

* * * * *

UNITED STATES PATENT AND TRADEMARK OFFICE
CERTIFICATE OF CORRECTION

PATENT NO. : 5,106,355

DATED : April 21, 1992

INVENTOR(S) : Shinji Nishimura et al.

It is certified that error appears in the above-identified patent and that said Letters Patent is hereby corrected as shown below:

Column 1,
Claim 1, line 6, delete "teeth are" and insert therefor --is--;

Claim 1, line 7, delete "is" and insert therefor --teeth are--.

Signed and Sealed this

Third Day of August, 1993

Attest:

MICHAEL K. KIRK

*Attesting Officer*          *Acting Commissioner of Patents and Trademarks*